(12) United States Patent
Yabe

(10) Patent No.: US 6,743,105 B2
(45) Date of Patent: Jun. 1, 2004

(54) DAMPER ASSEMBLY

(75) Inventor: Hiroshi Yabe, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/949,936

(22) Filed: Sep. 12, 2001

(65) Prior Publication Data

US 2002/0032062 A1 Mar. 14, 2002

(30) Foreign Application Priority Data

Sep. 11, 2000 (JP) ........................................ 2000-274323

(51) Int. Cl.$^7$ ................................................ F16D 3/66
(52) U.S. Cl. ........................................ 464/68; 464/24
(58) Field of Search ........................... 464/24, 64, 66, 464/67, 68; 192/203

(56) References Cited

U.S. PATENT DOCUMENTS

| | | | |
|---|---|---|---|
| 4,947,700 A | | 8/1990 | Kern |
| 5,218,884 A | * | 6/1993 | Rohrle ...................... 464/68 X |
| 5,401,213 A | * | 3/1995 | Muchmore et al. ........... 464/68 |
| 5,411,439 A | * | 5/1995 | Sacher ........................ 464/67 |
| 5,454,459 A | * | 10/1995 | Sadakari et al. .......... 464/24 X |
| 5,487,704 A | * | 1/1996 | Friedmann et al. ........... 464/24 |
| 5,505,288 A | * | 4/1996 | Tomiyama et al. ....... 464/68 X |
| 5,511,446 A | * | 4/1996 | Kajitani et al. .......... 464/68 X |
| 5,653,639 A | * | 8/1997 | Gassmann ................ 464/68 X |
| 5,752,884 A | | 5/1998 | Yabe |

\* cited by examiner

Primary Examiner—Greg Binda
(74) Attorney, Agent, or Firm—Crowell & Moring LLP

(57) ABSTRACT

A damper assembly includes a driving member, a coil spring, a driven member drivable by the driving member via the coil spring, and dividers by which the coil spring is divided into a number of spring sections. The relative rotation between the driving member and the driven member via the coil spring is limited by the engagement between one or more engageable portions arranged on the driving member at predetermined locations and the corresponding engageable portions arranged on the driven member at predetermined locations.

4 Claims, 7 Drawing Sheets

DAMPER ASSEMBLY

BACKGROUND OF THE INVENTION a) Field of the Invention

This invention relates to a damper assembly to be disposed between an engine and a transmission, especially to a damper assembly a coil spring of which is protected from permanent setting in fatigue or breakage.

b) Description of the Related Art

In a conventional damper assembly, a driven member is driven via a coil spring by a driving member connected directly to an engine. This conventional construction is accompanied by an unavoidable drawback that due to over-loads applied by combustion in the engine, the coil spring is repeatedly compressed fully with all coils brought into contact with adjacent coils, resulting in permanent setting in fatigue or breakage.

SUMMARY OF THE INVENTION

With the foregoing in view, the present invention has as a primary object the provision of a damper assembly a coil spring of which is protected from permanent setting in fatigue or breakage.

According to one aspect of the invention, a damper assembly includes a drive plate, a driven member, a damper mechanism, a stopper mechanism, front and rear covers, and a retainer cover. The is rotatable relative to the drive plate. A damper mechanism includes a spring, a spring seat on the drive plate, and a spring seat on the driven member. The spring is disposed between the spring seat on the drive plate and the spring seat on the driven member. The stopper mechanism includes an engageable portion on the drive plate, and an engageable portion on the driven member. The relative rotation between the drive plate and the driven member is limited by engagement between the engageable portion on the drive plate and the engageable portion on the driven member. The damper mechanism and the stopper mechanism are arranged in the same plane that is normal to an axis of the driven member. The front, rear and retainer covers form a sealed hollow space in which the drive plate, spring, and driven member are disposed. The sealed hollow space is filled with a viscous medium such that viscous damping resistance is applied to the relative rotation between the drive plate and driven member.

In a preferred embodiment of the invention, the engageable portion on the drive plate is arranged on an inner circumference of the drive plate, and the engageable portion on the hub is arranged on an outer circumference of the hub. The engageable portions on the drive plate and hub are brought into engagement with each other by the relative rotation between the drive plate and the driven member.

In another preferred embodiment of the invention, the drive plate has a tab and two engageable portions arranged with a predetermined interval on the tab, and the hub has a tab and two engageable portions arranged with a predetermined interval on the tab.

The damper assembly may further include an intermediate member arranged for relative rotation between the driving member and the driven member and formed integrally with the dividers. The relative rotation between the driving member and the intermediate member via the coil spring is limited by the engagement between one or more engageable portions arranged on the driving member at predetermined locations and one or more of a corresponding first set of engageable portions arranged on the intermediate member at predetermined locations. The relative rotation between the intermediate member and the driven member is limited by the engagement between one or more of a second set of engageable portions arranged on the intermediate member at predetermined locations and the corresponding engageable portions arranged on the driven member at predetermined locations.

Owing to the above-described construction, the coil spring is limited in coil angle whenever a predetermined load or a load greater than the predetermined load is applied. This limitation makes it possible to protect the coil spring from over-loads and hence, from permanent setting in fatigue or breakage without requiring additional parts. With a minimized increase in the manufacturing cost, the coil spring can therefore be protected from permanent setting in fatigue or breakage.

Preferably, the damper assembly may be effectively sealed within a hollow space formed by a front cover and rear cover, which are fixedly secured on the driving member, and a retainer cover plate. The hollow space is filled with a viscous medium such that viscous damping resistance is applied to relative motion between the coil spring and the driven member (and the intermediate member if any). This preferred embodiment makes it possible to effectively reduce wear and noise which occur between the associated members.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
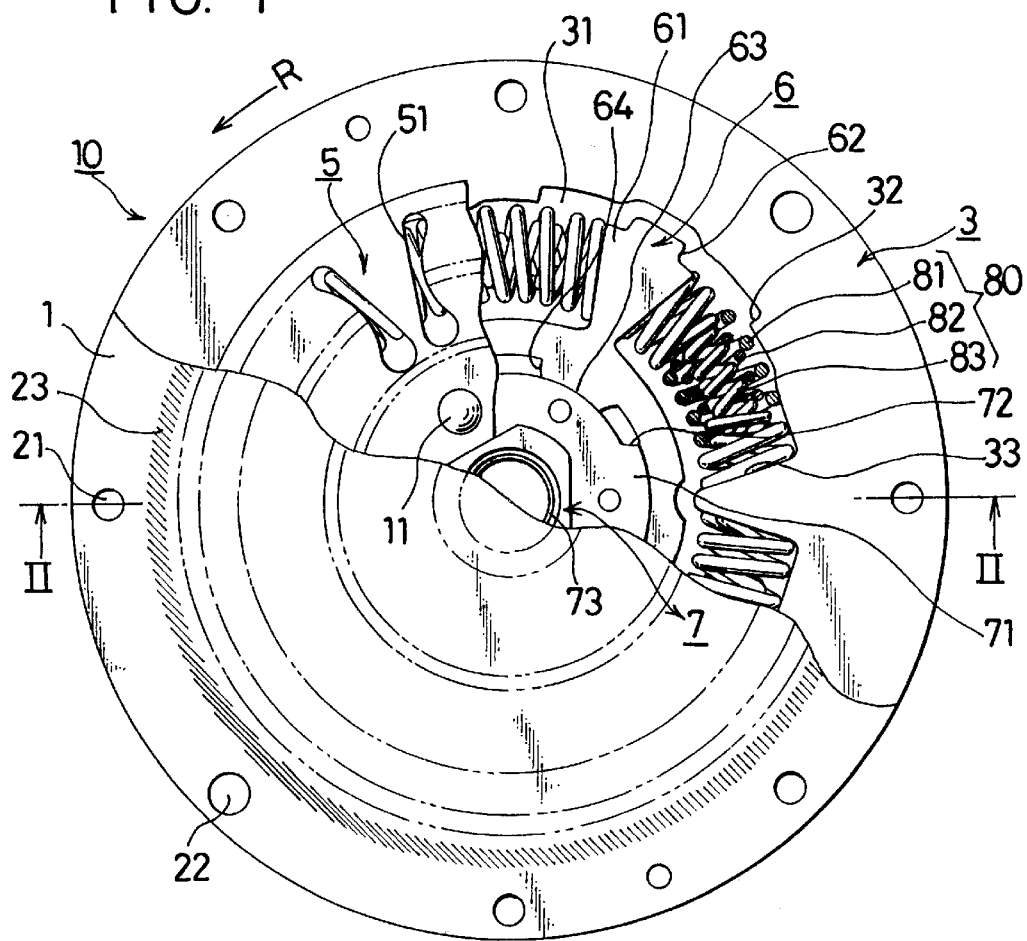
FIG. 1 is a front view of a damper assembly according to a first embodiment of the present invention, in which parts of members are successively cut off.

Referring first to FIGS. 1 through 4, a description will be made of the damper assembly 10 according to the first embodiment of the present invention. Illustrated in these drawings are a first cover 1, a rear cover 2, a drive plate 3 directly connected to a power output shaft of an engine, a retainer cover plate 4, a retainer plate 5 drivable by the drive plate 3 via coil springs 80, a hub 7 fixedly secured on the retainer plate 5 by means of rivets 11, and a divider ring 6 dividing the coil springs 80 into plural spring sections. The divider ring 6 is arranged movably to predetermined extent relative to the hub 7.

Also depicted are spring pockets 31 formed in the drive plate 3, shoulders 32 formed on the drive plate 3 at predetermined positions, and spring seats 33 formed on the drive plate 3. Designated at numeral 51 are spring seats formed on the retainer plate 5. Between each spring seat 51 and its corresponding spring seat 33 of the drive plate 3, pressing action is performed via the associated coil spring 80.

In the illustrated first embodiment, the drive plate 3 corresponds to a driving member, the retainer plate 5 and hub 7, in combination, corresponds to a driven member, and the divider ring 6 corresponds to an intermediate member.

Each coil spring 80 is divided by a corresponding tab 61 of the divider plate 6 into spring portions. In the illustrated embodiment, there are three sets of coil springs 80 between the drive plate 3 and the retainer plate 5. These three sets of coil springs 80 are divided by the three tabs 61 of the divider ring 6, respectively, so that there are six sub-sets of coil springs in total. In the illustrated embodiment, each coil spring 80 is constructed of a triple spring which is in turn formed of an outermost spring 81, a middle spring 82 and an innermost spring 83. The drawings also show mounting rivet bores 21, positioning bores 22, and welds 23.

The division of coil springs 80 has made it possible to use shorter coil springs. In addition, even if the individual sub-sets of the coil springs are linear springs, they can be arranged along a circle as depicted in the drawings. This assures smooth and accurate spring action.

It is to be noted that in the drawings, the damper assembly rotates in the direction of arrow R (i.e., counterclockwise). When the drive plate 3 rotates upon receipt of an engine output, the drive plate 3 drives the retainer plate 5 via the coil springs 80 and the divider ring 6, and also drives the hub 7 fixedly secured with the retainer plate 5. Power is then outputted through a power output shaft connected to the hub 7 via splines 73.

In this first embodiment, the front cover 1 and the rear cover 2 are fixedly secured at the welds 23 with the drive plate 3 as a driving member, and the retainer cover 4 is fixedly secured on the retainer plate 5, so that the damper assembly is effectively sealed with a hollow space formed therein. The hollow space is filled with a viscous medium, such as grease or oil, as a lubricating oil. This viscous medium applies viscous damping resistance to relative motions among the coil springs, the divider ring 6 as an intermediate member and the retainer plate 5 as a driven member to effectively reduce wear and noise.

Figure 3:
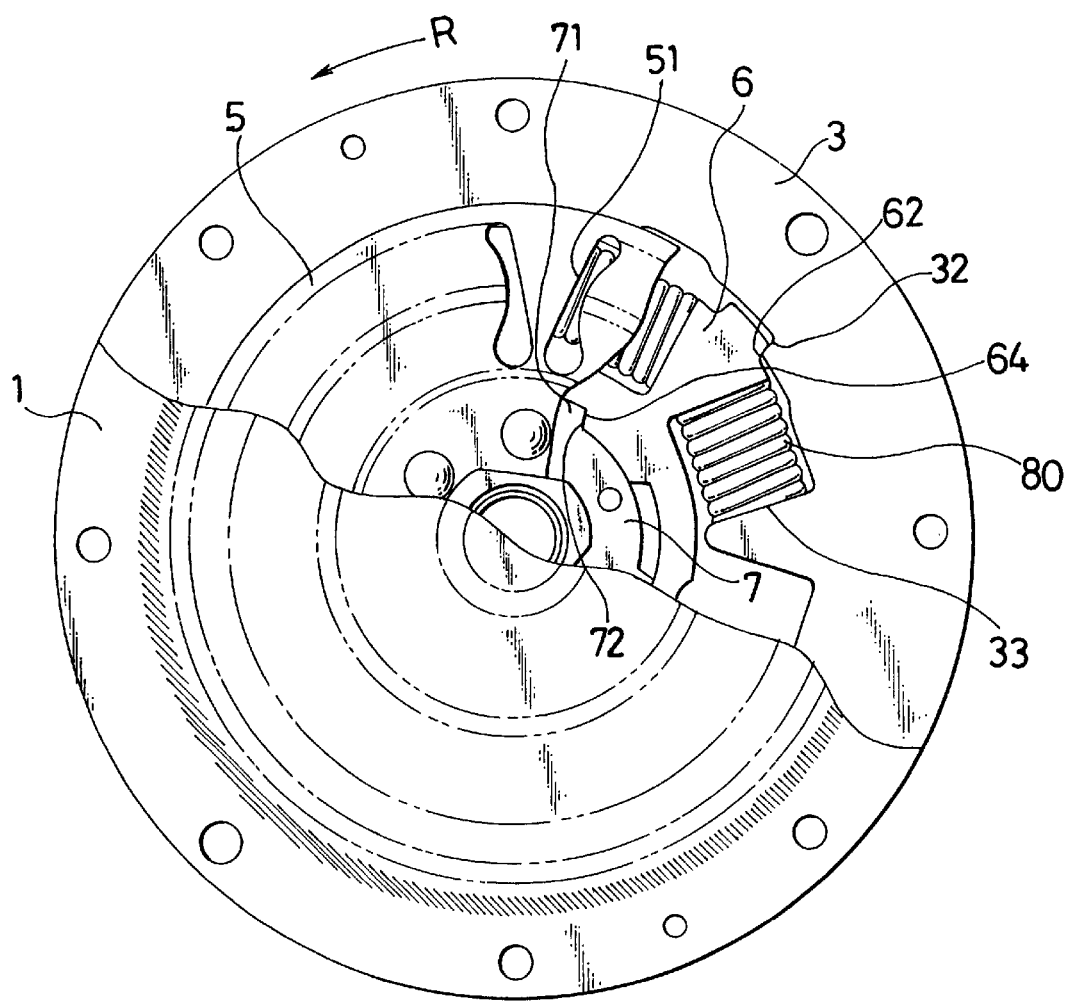
FIG. 3 is a front view of the damper assembly according to the first embodiment of the present invention when operated to maximum extent.
Figure 4:
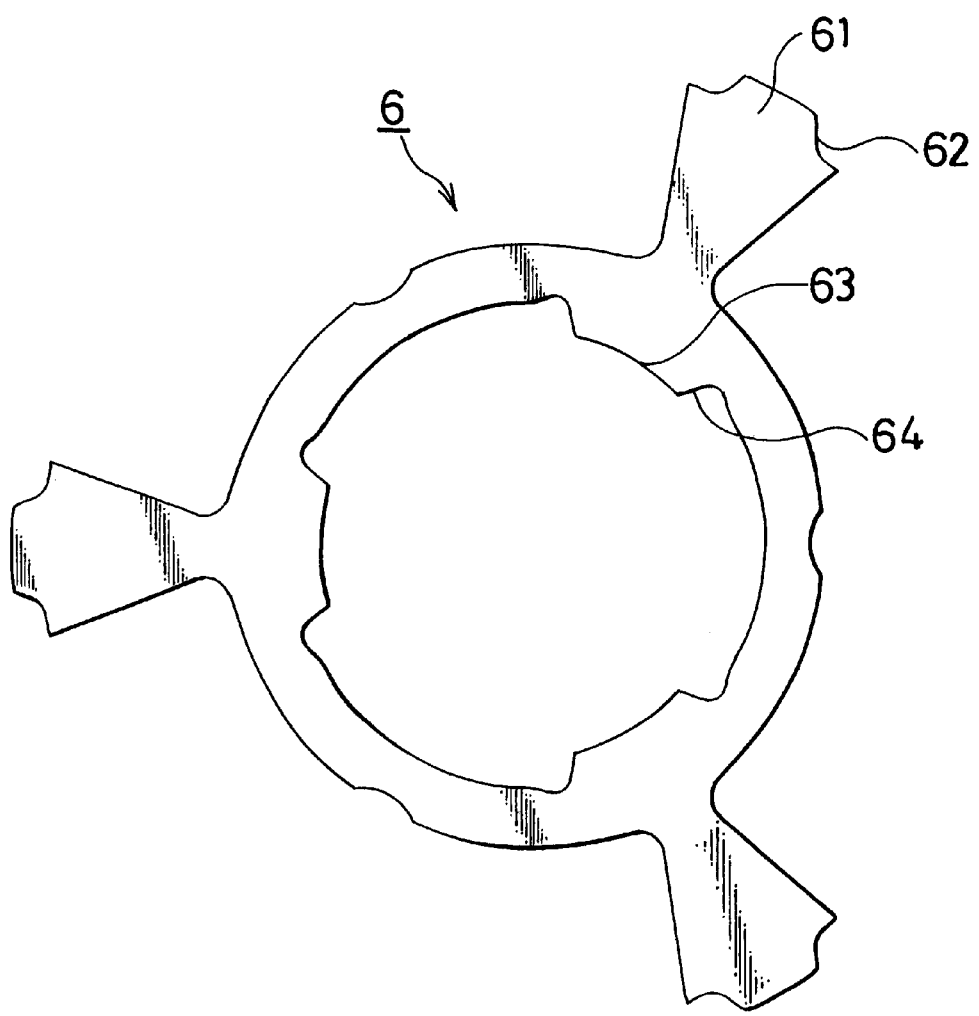
FIG. 4 is a front view of a divider ring in the damper assembly according to the first embodiment of the present invention.

In FIG. 3, the damper assembly has been operated to the maximum extent. To protect each spring from permanent setting in fatigue or breakage by preventing the spring from being fully compressed with all coils brought into contact with adjacent coils, the shoulders 32 of the drive plate 3 are bround into contact with shoulders 62 arranged on the tabs 61 of the divider ring 6, and shoulders 64 arranged on tabs 63 formed on an inner circumference of the divider ring 6 are brought into contact with shoulders 72 of tabs 71 formed on an outer circumference of the hub 7. As a result, the drive plate 3, the divider ring 6, the retainer plate 5 and the hub 7 are prevented from any further relative rotations. Accordingly, the springs are not compressed any further.

Referring next to FIGS. 5 through 10, a description will be made of the damper assembly 110 according to the second embodiment. A drive plate 103 in the damper assembly of the second embodiment has spring pockets 35, spring seats 36, a central bore 37, tabs 38, and shoulders 39 (see FIG. 8).

Figure 2:
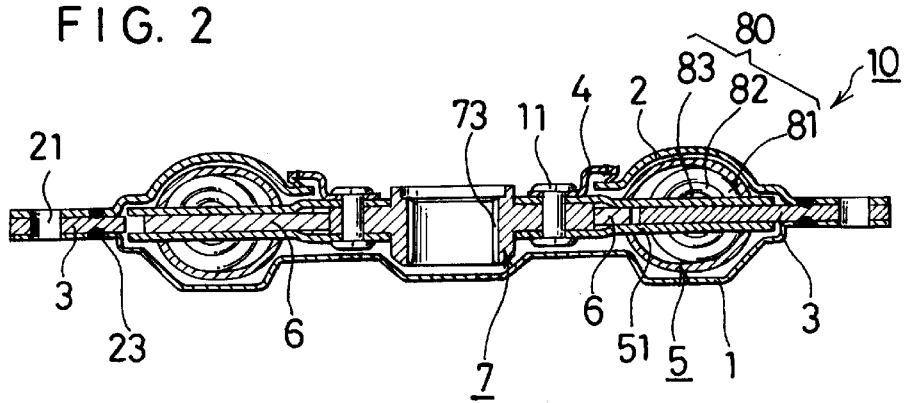
FIG. 2 is a cross-sectional view of the damper assembly according to the first embodiment of the present invention, taken in the direction of arrows II—II of FIG. 1.
Figure 5:
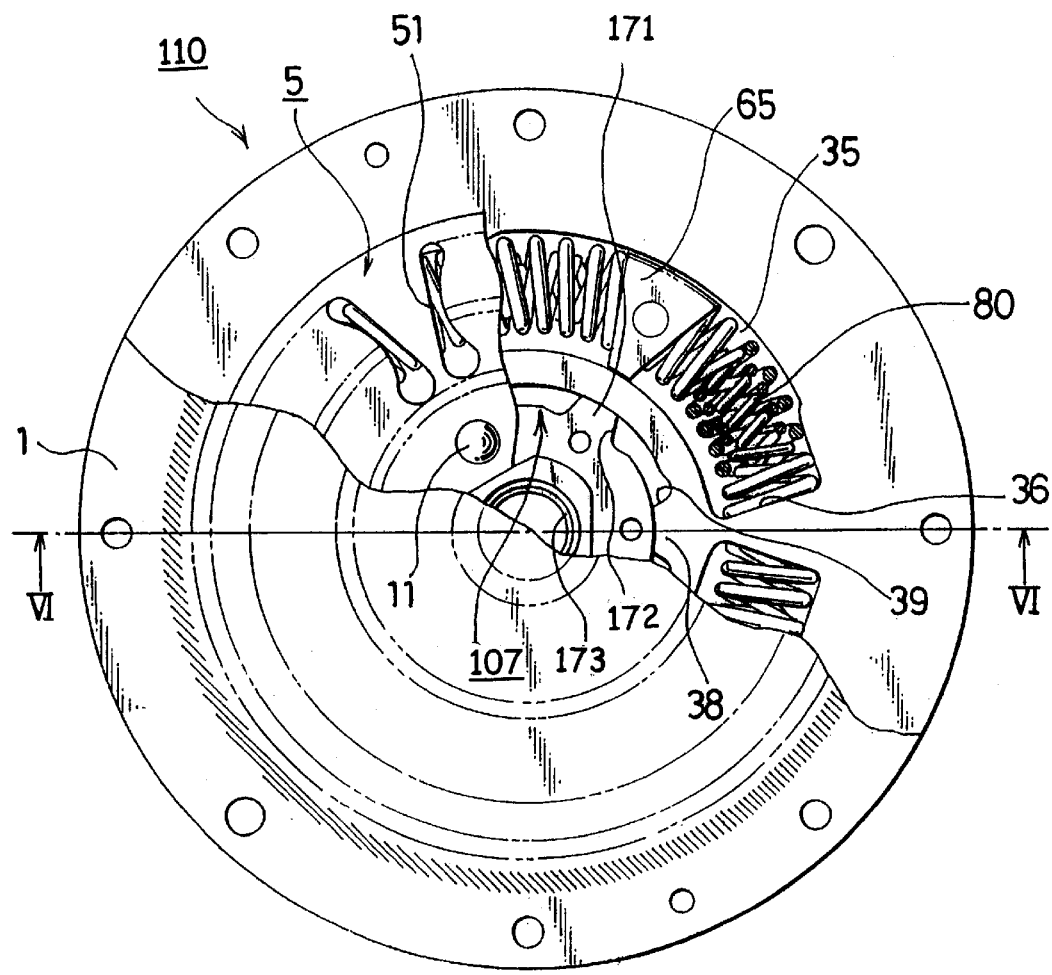
FIG. 5 is a similar front view as FIG. 1, and shows a damper assembly according to a second embodiment of the present invention.
Figure 6:
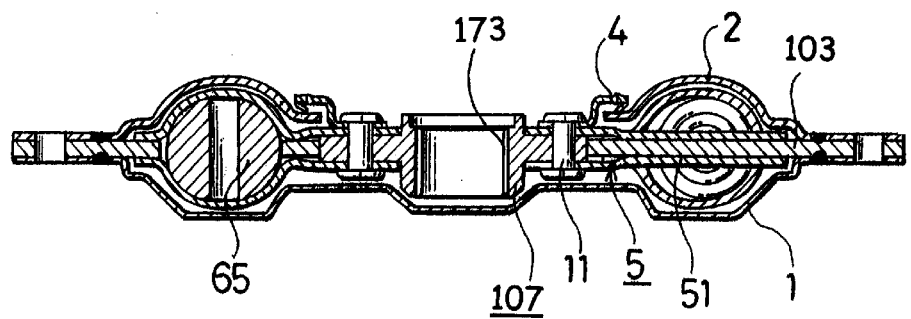
FIG. 6 is a cross-sectional view of the damper assembly according to the second embodiment of the present invention, taken in the direction of arrows VI—VI of FIG. 5.

A spring dividing means as an intermediate member is not such a divider ring as in the first embodiment, but is formed as dividers 65 received in the spring pockets 35, respectively. The second embodiment is similar in the remaining fundamental construction to the first embodiment. In FIGS. 5 and 6, those parts of the damper assembly which are the same or equivalent to corresponding parts in FIGS. 1 and 2 are shown by the same reference numerals and are not described further.

Figure 7:
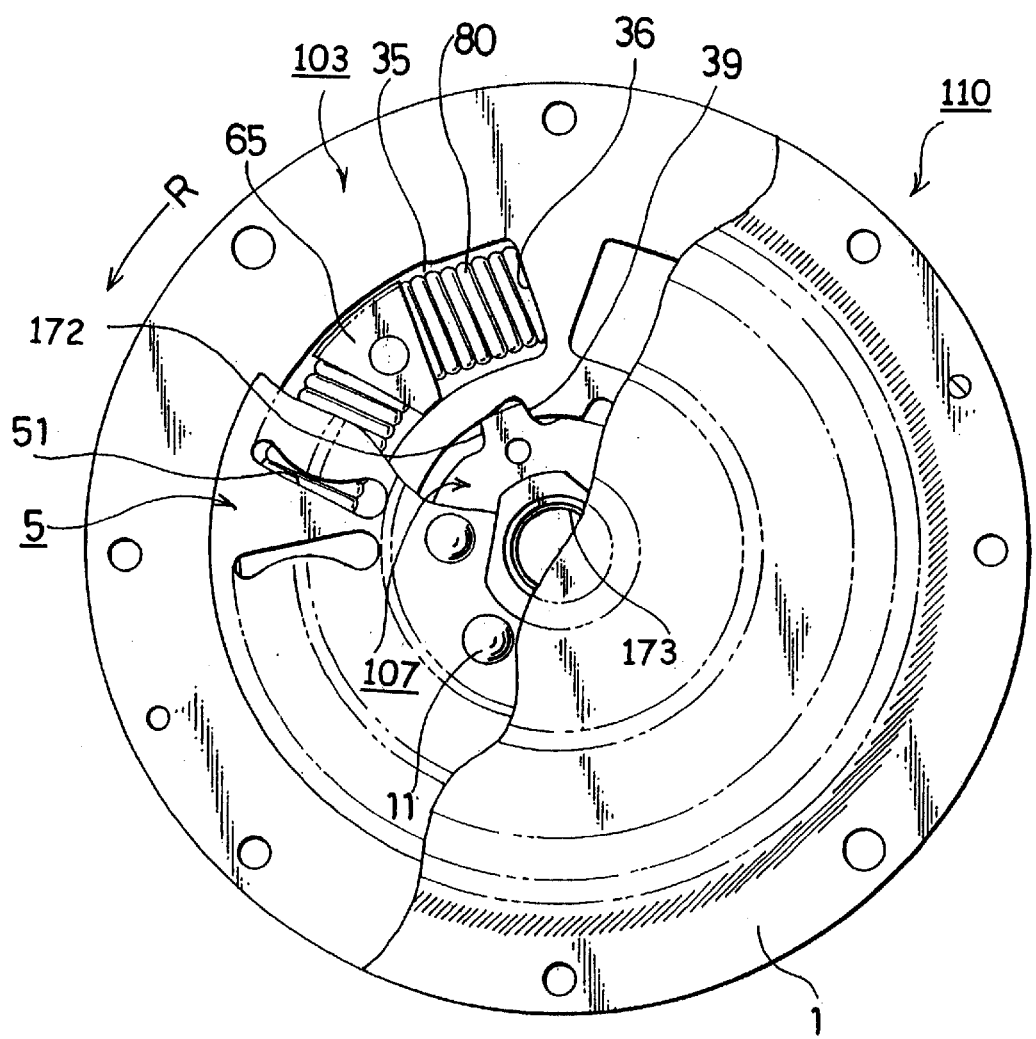
FIG. 7 is a similar front view as FIG. 3, and illustrates the damper assembly according to the second embodiment of the present invention when operated to maximum extent.
Figure 8:
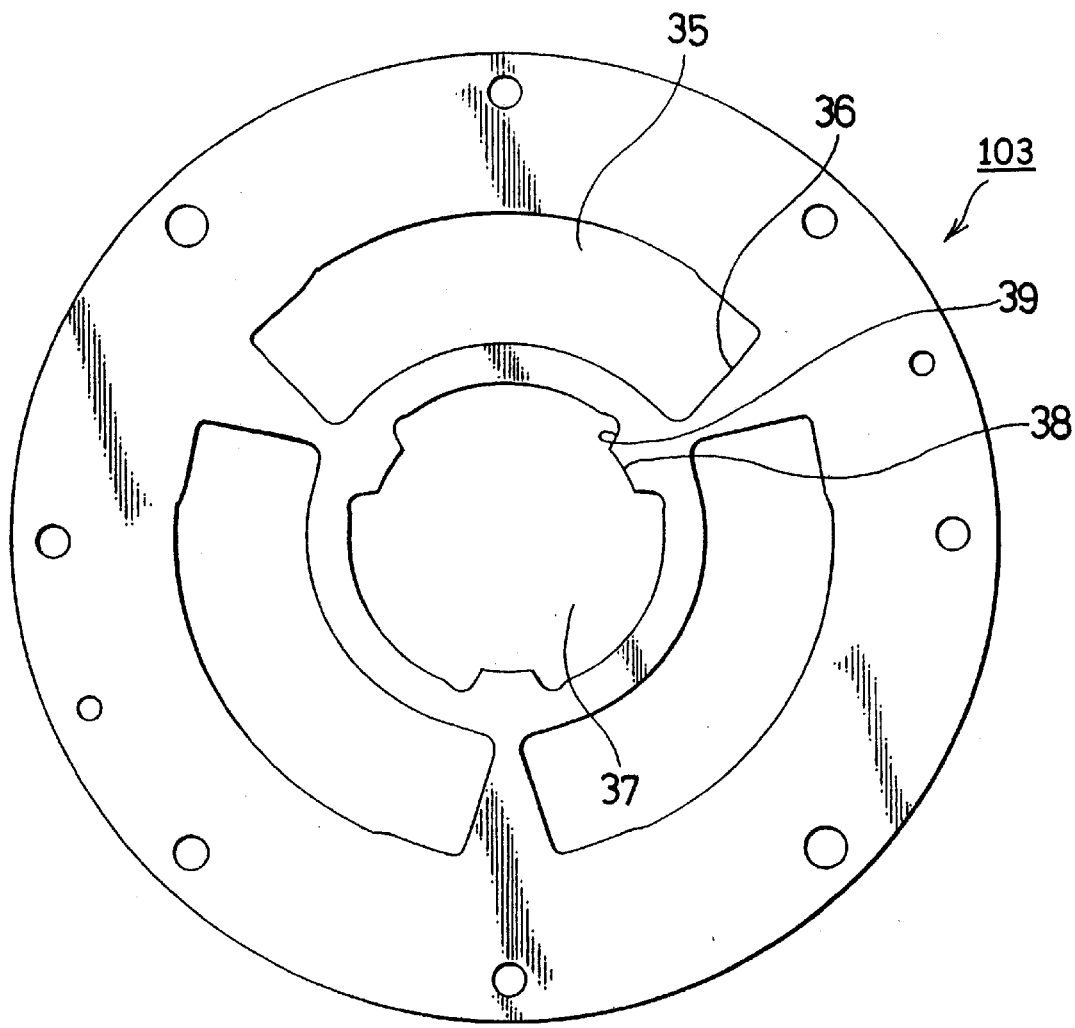
FIG. 8 is a front view of a drive plate in the damper assembly according to the second embodiment of the present invention.
Figure 9:
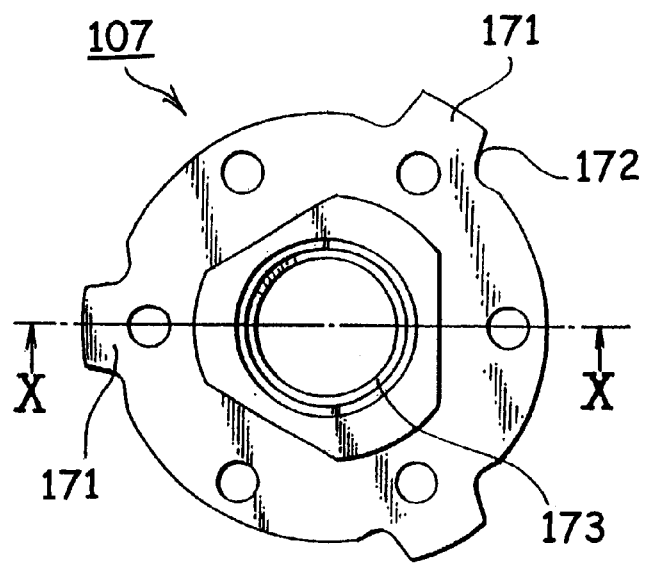
FIG. 9 is a front view of a hub in the damper assembly according to the second embodiment of the present invention.
Figure 10:
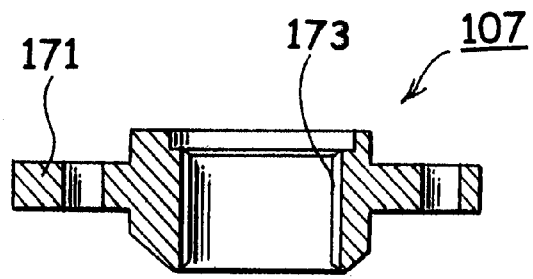
FIG. 10 is a cross-sectional view of the hub in the damper assembly according to the second embodiment of the present invention, taken in the direction of arrows X—X of FIG. 9.

In FIG. 7, the damper assembly has been operated to the maximum extent as in FIG. 3. Upon receipt of an engine output, the drive plate 103 pushes the unit of the retainer plate 5 and hub 107, as a driven member, in the direction of arrow R via the coil springs 80 and the dividers 65. If the load reaches a predetermined vale or greater, the shoulder 39 of the drive plate 103 are brought into contact or engagement with the shoulders 172 of the hub 107 so that the coil springs 80 are protected from further compression.

As discussed above and shown in FIGS. 5 and 6, the damper assembly 110 includes a damper mechanism that has one or more springs 80, one or more spring seats 36 on the drive plate 103 or on the driven member. The damper assembly 110 further includes a stopper mechanism that has engageable portions 39, 172 on the drive plate 103 and on the driven member 107. The damper mechanism and the stopper mechanism are arranged in the same plane that is normal to an axis of the driven member 107.

The engageable portion 39 on the drive plate 3 is arranged on an inner circumference of the drive plate 103, and the engageable portion 172 on the hub 107 is arranged on an outer circumference of the hub 107. The engageable portions 39, 172 on the drive plate 103 and hub 107 are brought into engagement with each other by the relative rotation between the drive plate 103 and the driven member 107.

The drive plate 103 has a tab 38 and two engageable portions 39 arranged with a predetermined interval on the tab 38, and the hub 107 has a tab 171 and two engageable portions 172 arranged with a predetermined interval on the tab 171.

This application claims the priority of Japanese Patent Application 2000-274323 filed Sep. 11, 2000, which is incorporated herein by reference.

What is claimed is:

1. A damper assembly comprising:
   a drive plate;
   a driven member, wherein the driven member is rotatable relative to the drive plate;
   a damper mechanism including
      a spring,
      a spring seat on the drive plate, and
      a spring seat on the driven member, wherein the spring is disposed between the spring seat on the drive plate and the spring seat on the driven member;
   a stopper mechanism including:
      an engageable portion on the drive plate, and
      an engageable portion on the driven member, wherein the relative rotation between the drive plate and the driven member is limited by engagement between the engageable portion on the drive plate and the engageable portion on the driven member, wherein the damper mechanism and the stopper mechanism are arranged in the same plane that is normal to an axis of the driven member;

front and rear covers; and a retainer cover, wherein the front, rear and retainer covers form a sealed hollow space in which the drive plate, spring, and driven member are disposed, and wherein the sealed hollow space is filled with a viscous medium such that viscous damping resistance is applied to the relative rotation between the drive plate and driven member.

2. A damper assembly according to claim 1, wherein the driven member includes a hub and a retainer plate connected to the hub, wherein the spring seat on driven member is on the retainer plate, and wherein the engageable portion on the driven member is on the hub.

3. A damper assembly according to claim 2, wherein the engageable portion on the drive plate is arranged on an inner circumference of the drive plate, and the engageable portion on the hub is arranged on an outer circumference of the hub, and wherein the engageable portions on the drive plate and hub are brought into engagement with each other by the relative rotation between the drive plate and the driven member.

4. A damper assembly according to claim 2, wherein the drive plate has a tab and two engageable portions arranged with a predetermined interval on the tab, and the hub has a tab and two engageable portions arranged with a predetermined interval on the tab.

* * * * *